Welding Heat Input $J_c = \frac{60 E_c I_c}{V_c}$ joules/cm

Cooling Time $S_c$(sec)

Plate Thickness $t$(mm)

United States Patent Office 3,192,079
Patented June 29, 1965

3,192,079
ARC WELDING METHOD
Otomaro Takagi, Nishinomiya, and Shigeru Nishi and Kazuhisa Suzuki, Kobe, Japan, assignors to Shin-Mitsubishi Jukogyo Kabushiki Kaisha, Tokyo, Japan, a corporation of Japan
Filed Apr. 3, 1962, Ser. No. 184,783
Claims priority, application Japan, Dec. 30, 1961, 36/48,344
8 Claims. (Cl. 148—127)

This invention relates to an arc welding method whereby deposit metals controlled in metallurgical quality are welded on base metallic members.

One of the methods previously used to heat treat a so-called welded joint including a deposit metal on a structure and a heat affected zone in the same is to control the metallurgical quality of the welded joint by placing the entire structure in a heat-treatment furnace after the completion of welding operation.

However, as there is a limitation as to dimension of a structure that can be put in a heat-treatment furnace, it has been practically impossible to apply the abovedescribed method to those structures of large dimension exceeding such limitation. Recently, in order to protect a large structure from the occurrence of brittle fracture, high notch toughness steels excellent in strength, ductility and toughness have been used. However, welded joints for such steels welded by any conventional method can not be subjected to heat-treatment. In addition, a deposit metal as welded exhibited not only a very low value of notch toughness but also that portion of the welded joint affected by welding heat became brittle with the result that brittle fracture could originate from the welded joint. For these reasons it has been previously recognized that the application of welding process to high notch toughness steels can not be expected to produce a satisfactory result. Further, an attempt to control the metallurgical quality of a welded joint alone after the completion of welding operation has been proved to be not very successful.

Accordingly, it is an object of the invention to provide an improved arc welding method for high notch toughness steel adapted to form on a member of base metal a welded joint which is substantially identical with the base metal in physical properties and more particularly having a high notch toughness comparable to that of the base metal.

It is another object of the invention to provide an improved arc welding method including the step of controlling, during welding a metallurgical quality of a welded joint on a member of base metal to thereby improve the physical properties, such as notch toughness, of the joint.

It is another object of the invention to provide an improved automatic arc welding method using a plurality of consumable electrodes to effect automatic welding to provide a sound welded joint.

With these objects in view, the invention is an arc welding method comprising the steps of cooling a leading deposit metal formed on a member of base metal to be welded, at a cooling rate in a normalizing stage, and welding a trailing deposit metal on the leading deposit metal, when the latter metal has a temperature between the $M_s$ point and the $M_f$ point for the same, to temper the leading deposit metal whereby a deposit metal controlled in metallurgical quality is formed on the member of base metal. The terms "$M_s$ point" and "$M_f$ point" will be described hereinafter.

A leading deposit metal may be formed on a member of base metal by first depositing on the member an alloying deposit metal including any desired alloying element or elements, and then welding a deposit metal on the alloying deposit metal to form the leading deposit metal. Alternatively, the leading deposit metal may be formed directly by using a consumable alloyed electrode.

Conveniently a trailing deposit metal may be welded on a leading deposit metal by using a trailing consumable electrode disposed behind a leading consumable electrode at a predetermined distance therefrom dependent upon the temperature of the portion of the leading deposit metal on which the trailing deposit metal is welded.

The invention will become more readily apparent from the following detailed description taken in conjunction with the accompanying drawings in which.

According to the invention a leading consumable electrode can be first used to form a leading or preceding deposit metal on a member of base metal. This deposit metal as it is solidified is cooled at a cooling rate in a normalizing stage while a trailing consumable electrode maintained a predetermined distance from the leading electrode is used to weld a trailing or succeeding deposit metal on the leading deposit metal to temper the same whereby the welded portion of the base member is composed of a composite deposit metal controlled in metallurgical quality. At the same time, that zone of the base member affected by welding heat will be cooled at the optimum rate. Thus a brittle area which might be developed in the base member will be a minimum.

The method of the invention as briefly described is most suitable for effecting automatic welding of heat treated, high notch toughness steels.

From the foregoing it will be appreciated that, in accordance with the invention a preceding deposit metal first formed is solidified from its molten state and cooled at a cooling rate in a normalizing stage. The term "cooling rate in a normalizing stage" used herein means generally a cooling rate at which a steel is cooled from the austenite state to develop a mixed texture consisting of either ferrite, a transitional structure and martensite, or ferrite, pearlite, a transitional structure and martensite in the cooled steel.

Figure 1:
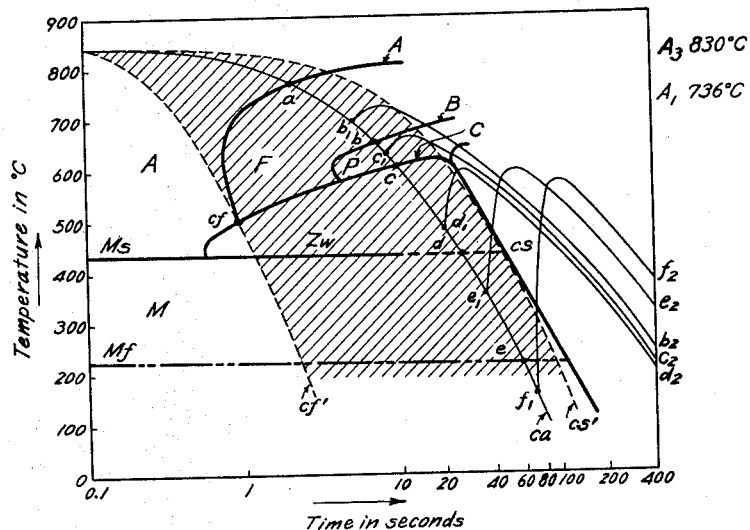
FIG. 1 is a graph useful for determining a cooling rate for a deposit metal in accordance with the teachings of the invention.

Referring now to FIG. 1 of the drawings, there is illustrated a transformation diagram obtained when an iron deposit has been continuously cooled from the $A_3$ point thereof and cooling rates in a normalizing stage abovementioned. In FIG. 1, the abscissa represents the cooling time of the deposit and the ordinate represents the temperature thereof. The cooling rate in a normalizing stage is illustrated by a shaded area on the diagram confined within a dotted curve $cs'$ representative of the slowest cooling rate (or the lower critical cooling speed) at which the martensite structure may be precipitated in the deposit, passing a point $cs$ and another dotted curve $cf'$ representative of the fastest cooling rate at which the pro-eutectoid ferrite may be developed.

Steel solidified by cooling the same at a rate within the cooling range just described has the most excellent toughness and ductility as compared with the case of using other cooling rates. As previously mentioned, the present method comprises cooling first the preceding metal deposit at a cooling rate in a normalizing stage. It is to be noted that, during a period of time corresponding to that portion of the illustrated cooling curve beginning at a point $Ms$ where the martensite starts to be precipitated and terminating at a point $Mf$ where the precipitation of the same is completed, trailing or succeeding deposit metal is welded on the preceding deposit metal for the purpose of tempering the same.

Upon forming the trailing deposit metal, the upper portion of the preceding deposit metal will be re-melted and heated to a temperature above the $A_3$ point. However, the greater part of re-melted, heated portion of the preceding deposit metal will be heated to a temperature below the $A_1$ point. The preceding deposit metal will be subject to the so-called tempering treatment through that re-heating process.

The reason why the re-heating temperature of the preceding deposit metal is restricted as just described when the succeeding deposit metal is being deposited is as follows: It is now assumed that the preceding deposit metal is cooled at a cooling rate in a normalizing stage illustrated by a solid curve $ca$. It is also assumed that the cooling curve $ca$ intersects at a point $a$ a curve A on which the ferrite beings to be preciptated from austenite, and intersects at a point $b$ a curve B on which pearlite begins to be precipitated from austenite, and that the cooling curve $ca$ further intersects at a point C a curve C on which the transitional structure begins to be formed. It is further assumed that the assumed cooling curve $ca$ intersects at a point $d$ a line $Ms$ representative of points at which the texture of steel begins to be transformed to martensite and that the curve $ca$ intersects at a point $e$ a line $Mf$ representative of points at which said transformation of texture is completed.

It is now assumed that, when the preceding deposit metal is at a temperature corresponding to a point such as $b_1$ on the portion $ab$ of the cooling curve $ca$ at which the deposit metal has the structure of ferrite mixed with austenite, the same is re-heated by a trailing or succeeding deposit metal formed thereon. The preceding deposit metal may be cooled for example along a curve $a$-$b_1$-$b_2$ and will be very delayed in the transformation of austenite to ferrite. This causes the preceding deposit metal to have a dendritic structure in which the feather-like ferrite is very predominant. Accordingly, the effect of tempering such deposit metal is low.

If the preceding deposit metal is re-heated at a point such as $c_1$ on the portion $bc$ of the cooling curve $ca$ at which a portion of austenite in the deposit metal is being transformed to pearlite with the precipitation of ferrite completed, for the same reason as in the abovementioned case, then a cooling curve follows a line $a$-$c_1$-$c_2$. In this case austenite is prevented from being transformed to the transitional and martensite structures with the result that the deposit metal has its structure comprising ferrite mixed with pearlite in which ferrite is predominant. Therefore, the deposit metal will not be highly tempered.

If the preceding deposit metal is re-heated at a point such as $d_1$ on the portion $cd$ of the cooling curve $ca$ at which the deposit metal has its structure comprising ferrite, pearlite, the transitional structure and austenite, for the same reason as in the previous case then the same may be cooled for example along a curve $a$-$d_1$-$d_2$. Then the deposit metal will have a texture in which the transitional structure has been transferred to a spheroidized ferrite and pearlite and can not provide a tight crystalline structure.

On the other hand, if the leading or preceding deposit metal is re-heated in a similar manner at a point such as $e_1$ within a temperature range from the point $d$ corresponding to the $Ms$ point to the point $e$ corresponding to the $Mf$ point, a cooling curve may follow, for example, a line $a$-$e_1$-$e_2$. Then the deposit metal will have a structure consisting of ferrite, pearlite, transitional structure, martensite and austenite with the transitional and martensite structure in an unstable state obtained immediately after their formation. This re-heating effect leads to the recrystallization of the structure which spheroidizes the ferrite and pearlite structures to form the sorbite structure and to transform the untransformed austenite structure to the structure of ferrite mixed with pearlite. Thus a tight and tough weld is obtained.

If the leading deposit metal is re-heated at a temperature such as a point $f_1$ below the point $e$ a cooling curve may follow a line $a$-$f_1$-$f_2$. In this case, the transformation of the deposit metal has already been completed substantially. Therefore, the deposit metal has a spheroidized structure comprising ferrite, pearlite, transitional structure and martensite and can not provide a tight and tough weld.

From the foregoing it will be appreciated that if a leading or preceding deposit metal is being cooled at a cooling rate in a normalizing stage and if the deposit metal is re-heated by depositing a trailing or succeeding weld metal thereon when the preceding metal has its temperature within the range of the $Ms$ point to the $Mf$ point on the cooling curve then the resulting structure of the preceding metal is such that the transitional and martensite structures in an unstable state obtained immediately after their formation are transformed to the sorbite structure which, in turn exhibits the best temper effect.

It is to be understood that a trailing deposit metal deposited on a leading deposit metal according to the teachings of the invention forms a part of the finished weld. Therefore, the trailing deposit metal may be preferably cooled in the manner substantially similar to that previously described in conjunction with the leading deposit metal to thereby control the metallurgical quality thereof to provide a tight, tough weld.

It is to be noted that, in practicing the method of the invention thus far described, a deposit metal should be cooled at the particular cooling rate dependent upon the alloying elements contained in the same. The optimum value of that cooling rate can be readily determined by continuous cooling transformation diagrams plotted in conjunction with chemical constituents contained in a welding metal from which a deposit is formed.

As previously pointed out, the present method is advantageously applicable to a multi-electrode welding process so that any desired number of consumable electrodes may be used dependent upon the thickness of a plate to be welded with an equally satisfactory result.

It is also to be understood that, in order to produce a sound deposit metal by subjecting the same to control of metallurgical quality according to the invention, the welding metal should be sufficiently deoxidized and killed.

As an example, if a welding metal is to be deoxidized with manganese or silicon, the total content of oxygen in the metal is preferably at least equal to or less than 0.60%. In addition, manganese or silicon may be preferably contained in the metal in amounts of from 1.0 to 1.5% or from 0.3 to 0.5% respectively.

Also in order to improve strength, ductility and notch toughness at low temperature of a deposit metal, 0.5 to 4% nickel, 0.1 to 0.5% chromium and/or 0.1 to 0.5% molybdenum may be effectively added to the welding metal.

To add any desired alloying element or elements to a deposit metal, a welding wire of steel alloy containing such element or elements and/or a flux containing the same may be used in a submerged arc welding process. For a gas shielded arc welding process a welding wire of steel alloy containing the desired element or elements may be used. Alternatively, a welding steel alloy containing an alloying element or elements to be added may be first deposited in a welding groove on a base metal member and then fully re-melted by employing a welding wire used with a gas shielded arc welding process of conventional type to thereby diffuse the alloying element or elements into the deposit metal. In this way the deposit metal may be formed containing a predetermined alloying element or elements.

Figure 2:
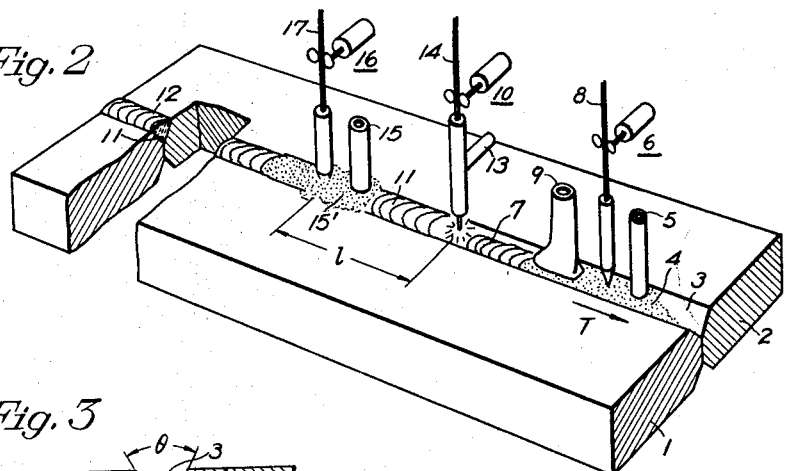
FIG. 2 shows schematically a perspective view of an arc welding device suitable for use in the invention.
Figure 3:
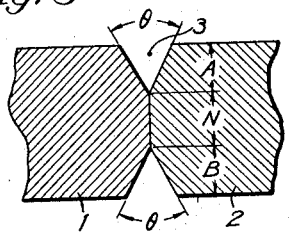
FIG. 3 shows a view, in cross section of a joint between a pair of members to be welded to each other.

Referring now to FIG. 2 of the drawings, there is schematically illustrated an arc welding device suitable for use in practicing the method of the invention thus far described. One of base metal members 1 is shown as being welded to the other base metal member 2 through a double V butt joint. Each of the base members 1 and 2 comprises a 60 kg./mm.² high strength, Mn-Si steel plate heat treated (whose thickness is 25 mm.). As best shown in FIG. 3, both base members butt each other to form a double V groove 3 on the engaging end portions thereof. The groove is so proportionated that $\theta=80°$, $A=B=8$ mm. and $N=9$ mm. The invention will be, by way of example, described in terms of a weld formed by using a submerged arc welding process to preliminarily deposit in a welding groove on a base metal an alloying deposit metal or bead containing any desired alloying element or elements, using a gas shielded arc welding process in gaseous carbon dioxide ($CO_2$) as a leading welding to re-melt the preliminarily deposited bead and form a leading or preceding bead, and using a submerged arc welding process as trailing welding to weld a trailing or succeeding bead on the preceding bead to thereby form a weld controlled in metallurgical quality.

It is assumed that an arc welding unit comprising a plurality of arc welding heads as will subsequently be described is travelling at a predetermined speed in the direction of the arrow T in FIG. 2 with the welding heads aligned with the groove 3 on the base metal. Under these circumstances, a bonded type flux 4 containing appropriate proportions of suitable alloying elements such as manganese, silicon, nickel and the like are first spread in the upper groove portion 3 by a discharge tube 5 as it travels. Then a submerged arc welding head generally designated at 6 is actuated to preliminarily deposit in the upper groove portion 3 an alloying bead 7 including the abovementioned alloying elements and insufficient to fully fill the groove portion. The welding head 6 comprises a roll of welding wire 8 serving to form the bead 7 in the groove portion 3. Any slag formed after the deposition of the bead 7 and the portion of the flux remaining on the bead can be removed by recovery means 9 so that the bead is clean.

As a leading or preceding welding, a gas shielded arc welding head generally designated at 10 is then operated to form a leading or preceding bead 11 on the alloying bead 7 in the groove portion 3 to weld the base members 1 and 2 as the head travels. The welding head 10 comprises a feed device for feeding gaseous carbon dioxide in the welding head 60 and a roll of welding wire 14 serving to form the preceding bead 11. During this welding operation the preliminarily deposited bead 7 is melted and the alloying elements are diffused in the molten mass comprising the bead 7 and a metal supplied by the welding head 10 until the preceding bead 11 is formed including the desired composition.

The preceding bead 11 thus formed is then subject to a critical heat-treatment according to the teachings of the invention. To this end, a submerged arc welding head generally designated at 16 is arranged to flow after the traveling welding head 10 along the groove 3 on the base members 1 and 2 with a predetermined distance maintained therebetween. The welding head 16 comprises a discharge tube 15 for supplying a flux and a roll of welding wire 17. With this arrangement, the welding head 16 can be operated to deposit a mass of metal on that portion of the preceding bead 11 spaced from the position of the preceding welding head 10 by the predetermined distance along the groove 3. It is to be noted that the predetermined distance denoted by the character "$l$" in FIG. 2 should be chosen such that the portion of the preceding bead 11 directly beneath the welding head 16 will be re-heated by a mass of metal deposited by that head at the time said portion of the preceding bead has been cooled along a particular cooling curve selected as the case may be, to thereby have its temperature between $Ms$ point and $Mf$ point on the extension of the curve.

With the welding head 16 put in the trailing welding operation, the molten mass of metal from the welding head 16 serves to re-melt the part of the preceding bead 11 adjacent the same to diffuse the alloying elements contained in the preceding bead 11 into the molten metal and also to add to the molten metal any desired alloying element or elements originating from the wire 17 and/or the flux 15'. Then the molten mixed mass of metal is solidified in a trailing or succeeding bead 12 which in turn is cooled at a cooling rate in a normalizing stage as will be understood from the previous description of FIG. 1.

After the upper groove portion has been welded in the manner thus far described, the base metal members 1 and 2 welded as a unit may be turned over and the lower groove portion 3 will be welded with a bead in the same manner as above described.

It will be understood that if the preceding arc welding operation is effected by using an alloyed steel wire as the wire 14, the preliminary arc welding operation represented by the components 4, 5, 6, 7 may be omitted.

Figure 4:
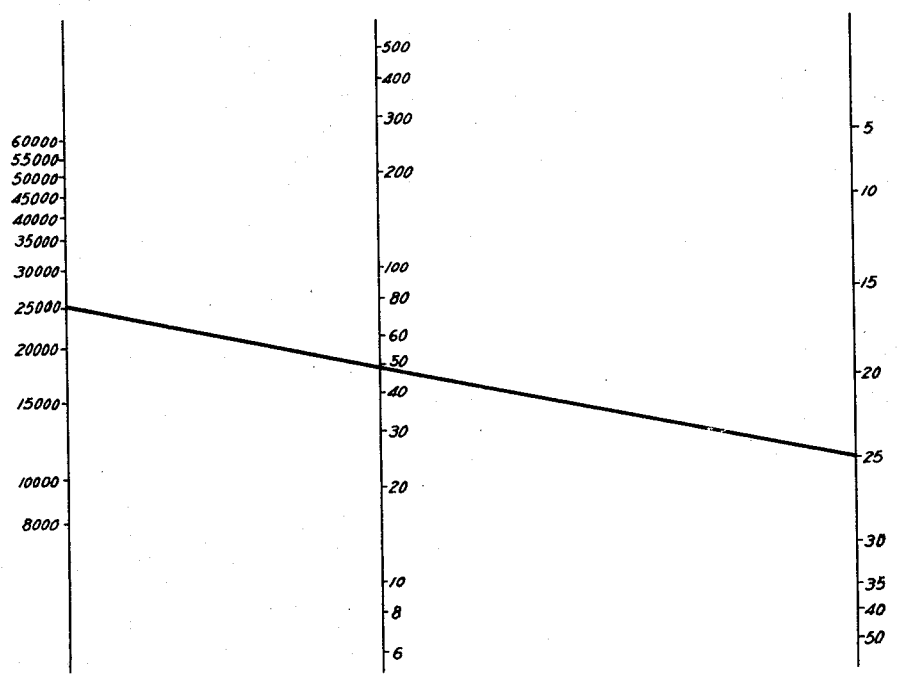
FIGS. 4 and 5 are monographs for computing a welding heat input based upon a cooling time of a deposit metal and a thickness of a member to be welded when the invention is applied to an arc welding process in gaseous carbon dioxide and a submerged arc welding process respectively.

From the foregoing it will be apparent that, in order to cool the preceding bead 11 at the cooling rate in a normalizing stage, a rate at which the same will be cooled must be controlled in accordance with a welding heat input provided by the preceding arc welding head 10. Studying the relationship among the thickness of a plate to be welded, the welding heat input and the cooling time during which a preceding bead such as 11 is cooled from 1500° to 400° C. with a welding groove having a configuration as shown in FIG. 3, the applicant has experimentally obtained the following equation:

$$S_c = \frac{\left(\frac{60 E_c I_c}{V_c}\right)^{0.845}}{1.1 \times 10^2 \left\{1 + \frac{2}{\pi} \tan^{-1}\left(\frac{t-24.5}{13}\right)\right\}} \quad (1)$$

where $S_c$=cooling time during which the preceding bead is cooled from 1500° to 400° C., in seconds,
$E_c$=welding voltage in volts,
$I_c$=welding current in amperes,
$V_c$=welding speed in centimeters per minute,
$t$=thickness of plate to be welded in millimeters The Equation 1 can be numerically solved by using a monograph shown in FIG. 4 wherein the left vertical line represents the welding heat input $$J_c = \frac{60 E_c I_c}{V_c} \text{ joules/cm.}$$

the middle vertical line the cooling time $S_c$ in seconds required for the preceding bead to be cooled from 1500° to 400° C. and the right vertical line represents the thickness $t$ of plate to be welded in millimeters.

If the monograph shown in FIG. 4 is used to determine the optimum rate at which the preceding bead 11 will be cooled in a normalizing stage then a continuously cooling transformation diagram will be first plotted with respect to the preceding bead and then the cooling time $S_c$ may be obtained from the transformation diagram. On the other hand, the thickness $t$ of a plate to be welded can be measured in any conventional manner. The respective values of the cooling rate and thickness lines in the monograph of FIG. 4 corresponding to the magnitudes of the cooling time $S_c$ and the thickness of plate $t$ respectively will give the corresponding value of a welding heat input on the welding heat input line in the same figure. Thus the optimum cooling rate can be determined. In this way welding conditions can be selected to cool the preceding bead in the optimum normalizing stage.

It is very desirable that a trailing bead, such as 12 deposited by trailing welding operation will give a preceding bead such as 11 the normalizing effect and simultaneously that the trailing bead per se will be cooled at the cooling rate in a normalizing stage. Therefore, the applicant also obtained experimentally the following equation under the same conditions as the Equation 1:

$$S_u = \frac{\left(\frac{60E_u I_u}{V_u}\right)^{1.2}}{4.3 \times 10^3 \left\{1 + \frac{2}{\pi} \tan^{-1}\left(\frac{t-17.5}{6.4}\right)\right\}} \quad (2)$$

where
$S_u$=cooling time during which the trailing bead is cooled from 1500° to 400° C., in seconds,
$E_u$=welding voltage in volts,
$I_u$=welding current in amperes,
$V_u$=welding speed in centimeters per minute,
$t$=thickness of plate to be welded in millimeters.

Figure 5:
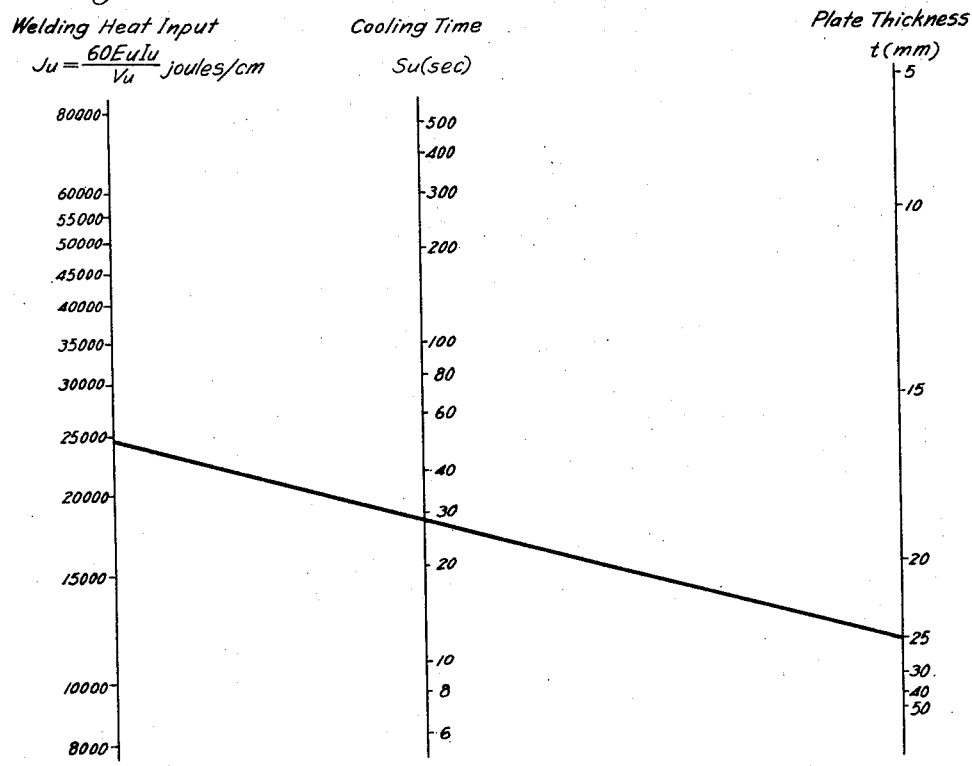

FIG. 5 shows a monograph for numerically solving the Equation 2. As in FIG. 4, the left vertical line represents a welding heat input $$J_u = \frac{60E_u I_u}{V_u} \text{ in joules/cm.}$$

the middle vertical line a cooling time $S_u$ in seconds during which a trailing bead is cooled from 1500° to 400° C. and the right vertical line represents a thickness $t$ of a plate to be welded in millimeters. The monograph can be utilized in the same manner as previously described in conjunction with FIG. 4.

As an example, the optimum cooling rate for the plate members 1 and 2 shown in FIG. 2 will be determined by using the monographs shown in FIGS. 4 and 5.

As above described, a continuously cooling transformation diagram was first plotted for the preceding bead 11 and gave a cooling time during which the bead 11 was cooled from 1500° to 400° C. a magnitude of from 39 to 53 seconds. It is recalled that the plate members 1 and 2 were 25 mm. in thickness. In FIG. 4, a straight line was drawn passing through a graduation 25 on the thickness line and a graduation 49 on the cooling time line and produced to intersect the welding heat input line. The point at which both lines were intersected gave a reading of about 25100. This figure indicated an amount of welding heat input to be applied to the portion of the plates to be welded. From the amount of welding heat input thus determined there were selected a welding current of from 550 to 580 amperes, a welding voltage of from 39 to 40 volts and a welding speed of from 52 to 55 centimeters per minute. The preceding bead was cooled at the particular cooling rate selected in the continuously cooling transformation diagram in order to normalize the bead.

It is recalled that a trailing bead, such as 12, serving to temper the preceding bead should be deposited on the preceding bead when the latter has a temperature between $M_s$ point and $M_f$ point. It was assumed that the trailing bead would be deposited on the preceding bead when the latter would have temperature of 400° C. between $M_s$ point and $M_f$ point. From the magnitude of cooling time $S_c$ previously obtained and the welding speed of from 52 to 55 centimeters per minute the distance $l$ between the leading and trailing electrodes (see FIG. 2) was chosen to range from 360 to 460 millimeters. The welding conditions for the trailing bead were determined in a similar manner to that previously described in conjunction with the preceding bead. In this way, there were determined a welding current of from 387 to 620 amperes, a welding voltage of from 36 to 38 volts and a welding speed of from 52 to 55 centimeters per minute.

In order to determine the physical properties of the welded joint formed in the manner thus far described, standard Charpy impact tests pieces with a V notch were cut from the welded plate in such a manner that the cut weld portion traversed the middle portion of the piece perpendicularly to the longer side thereof. These test pieces were subjected to an impact test at low temperatures. The result is illustrated in a curve A in FIG. 6. Also from the welded plate N.P.L. type drop hammer test pieces were cut including a weld traversing the middle portion thereof perpendicularly to the longer side and subjected to brittle fracture and propagation characteristic tests with a 27 kg. drop hammer dropped from a level of 5 meters above the test piece. The result is illustrated on the upper portion in FIG. 7.

Further, a pair of 25 mm. plates made of a heat-treated, low temperature steel of Mn-Si-Ni-Mo type which includes 0.99% Mn, 0.26% Si, 1.57% Ni and 0.30% Mo were butt welded to each other in the same manner as previously described. The welded joint thus formed was put to the abovementioned impact and drop hammer tests. The results are illustrated at a curve B in FIG. 6 and on the lower portion in FIG. 7 respectively.

Figure 6:
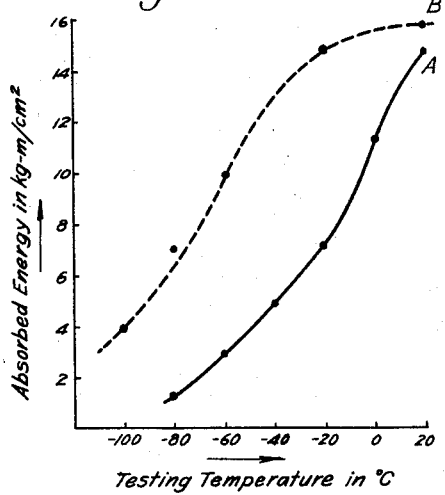
FIG. 6 is a graph plotting the energy absorbed by a weld of the invention against the tested temperature.
Figure 7:
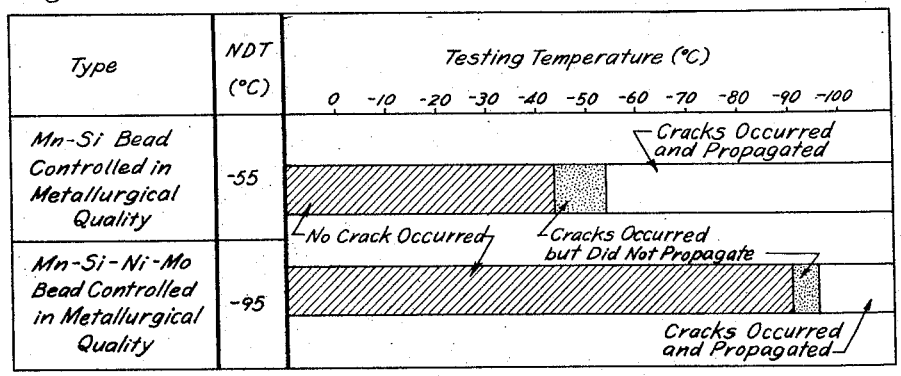
FIG. 7 is a graph illustrating the physical properties of a weld formed in accordance with the method of the invention.

From FIGS. 6 and 7 it will be appreciated that a bead heat-treated according to the teachings of the invention is comparable to a heat-treated base metal in physical properties and more particularly in high notch toughness.

Microscopic tests indicated that the trailing deposit metal had a mixed texture of fine grain ferrite, pearlite and transitional structure and that the preceding deposit metal consisted of an upper portion having a grain refined ferrite and pearlite structures and a lower portion having a quality controlled structure comprising tough sorbite.

From the foregoing it will be recognized the invention has provided an arc welding method by which a deposit metal can be effectively controlled in metallurgical quality during the welding operation and which provides a weld having characteristics comparable to those of a base metal without the necessity of effecting special heat treatment before or after the welding operation. Such heat treatment has been heretofore necessary. The invention can be reliably applied to welding of large complicated articles which could not be previously subjected to heat treatment. The invention also has provided monographs for determining welding heat input most suitable for tempering a deposit metal.

While the invention has been described in conjunction with preferred embodiments thereof it is to be understood that various changes and modifications may be resorted to without departing from the spirit and scope of the invention. For example, instead of a welding heat input any suitable heating and/or cooling may be externally effected to cool a deposit metal at the cooling rate in the normalizing stage. If desired, a weld may be formed through more than two welding processes.

What we claim is:

1. In an arc welding method in which a preceding ferrous base metal deposit is welded in a welding groove and thereafter has a succeeding ferrous base deposit metal welded thereon, the steps of cooling the preceding ferrous base deposit metal at a cooling rate within normalizing conditions for the preceding ferrous base deposit metal, and performing the step of welding the succeeding ferrous base deposit metal on said preceding ferrous base deposit metal at a point in time when the preceding ferrous base deposit metal has cooled to a temperature between the temperature at which martensite begins to form in said preceding ferrous base deposit metal and the temperature at which martensite stops forming in said preceding ferrous base deposit metal, to temper said preceding ferrous base deposit metal, whereby a ferrous base deposit metal is formed which is controlled in a metallurgical quality.

2. An arc welding method as claimed in claim 1 in which the step of cooling the preceding ferrous base deposit metal and determining the time at which the succeeding ferrous base metal deposit is welded over the preceding ferrous base metal deposit comprise controlling the amount of welding heat used in welding the preceding ferrous base deposit metal.

3. An arc welding method as claimed in claim 2 in which the controlling of the amount of welding heat used in welding the preceding ferrous base metal deposit and determining the time at which the succeeding ferrous base metal deposit is to be welded is according to the formula:

$$S_c = \frac{\left(\frac{60 E_c I_c}{V_c}\right)^{0.485}}{1.1 \times 10^2 \left\{1 + \frac{2}{\pi} \tan^{-1}\left(\frac{t-24.5}{13}\right)\right\}}$$

where
$S_c$=cooling time during which the preceding bead is cooled from 1500° to 400° C., in seconds,
$E_c$=welding voltage in volts,
$I_c$=welding current in amperes,
$V_c$=welding speed in centimeters per minute,
$t$=thickness of plate to be welded in millimeters.

4. An arc welding method as claimed in claim 1 further comprising the step of controlling the cooling of the succeeding ferrous base deposit metal so that it is within normalizing conditions for the succeeding ferrous base deposit metal.

5. An arc welding method as claimed in claim 4 in which the controlling of the cooling of the succeeding ferrous base deposit metal comprises controlling the amount of welding heat used in welding the succeeding ferrous base deposit metal according to the formula:

$$S_u = \frac{\left(\frac{50 E_u I_u}{V_u}\right)^{1.2}}{4.3 \times 10^3 \left\{1 + \frac{2}{\pi} \tan^{-1}\left(\frac{t-17.5}{6.4}\right)\right\}}$$

wherein
$S_u$=cooling time during which the trailing bead is cooled from 1500° to 400° C., in seconds,
$E_u$=welding voltage in volts,
$I_u$=welding current in amperes,
$V_u$=welding speed in centimeters per minute,
$t$=thickness of plate to be welded in millimeters.

6. An arc welding method, comprising the steps of depositing in a welding groove formed in an article to be welded a bead of alloying composition containing at least one alloying element to be added to the finished weld, welding a preceding ferrous base metal deposit in the welding groove over said alloying composition for remelting the alloying composition, cooling the preceding ferrous base deposit at a cooling rate within the normalizing conditions for the preceding ferrous base metal deposit as modified by the alloying composition, and welding a succeeding ferrous base deposit metal on said preceding ferrous base deposit metal at a point in time when the preceding ferrous base deposit metal has cooled to a temperature between the temperature at which martensite begins to form in said preceding ferrous base deposit metal and the temperature at which martensite stops forming in said preceding ferrous base deposit metal, to temper said preceding ferrous base deposit metal, whereby a ferrous base deposit metal is formed which is controlled in a metallurgical quality.

7. An arc welding method as claimed in claim 6 in which the preceding ferrous base deposit metal is welded by a gas shielded arc welding method.

8. An arc welding method as claimed in claim 6 in which the succeeding ferrous base deposit metal is welded by a submerged arc welding method.

References Cited by the Examiner
UNITED STATES PATENTS

| | | | |
|---|---|---|---|
| 2,032,977 | 3/36 | Delachaux | 148—127 |
| 2,262,705 | 11/41 | Tuttle | 148—127 |
| 2,273,086 | 2/42 | Bruce | 148—127 |
| 2,320,824 | 6/43 | Landis et al. | 219—73 |
| 2,489,002 | 11/49 | Babbitt | 219—73 |
| 2,620,423 | 12/52 | Komers et al. | 219—73 |

DAVID L. RECK, *Primary Examiner.*
RICHARD M. WOOD, *Examiner.*